(12) United States Patent
Hussein et al.

(10) Patent No.: US 6,281,149 B1
(45) Date of Patent: Aug. 28, 2001

(54) BALLISTIC PROTECTIVE WEAR FOR FEMALE TORSO

(75) Inventors: Mansour Hussein; Grey Parker, both of Raleigh, NC (US)

(73) Assignee: 3Tex, Inc., Cary, NC (US)

( * ) Notice: Subject to any disclaimer, the term of this patent is extended or adjusted under 35 U.S.C. 154(b) by 0 days.

(21) Appl. No.: 09/723,742

(22) Filed: Nov. 28, 2000

(51) Int. Cl.[7] .............................. B32B 5/26; D03D 23/00
(52) U.S. Cl. ........................ 442/239; 442/218; 442/242; 442/301; 139/383 R; 139/DIG. 1; 2/2.5
(58) Field of Search ........................ 2/2.5; 139/DIG. 1, 139/383 R; 442/239, 435, 205.4, 218, 242, 301

(56) References Cited

U.S. PATENT DOCUMENTS

| | | | |
|---|---|---|---|
| 3,981,310 | * 9/1976 | Donaghy | 450/40 |
| 5,021,281 | * 6/1991 | Bompard et al. | 428/116 |
| 5,198,280 | * 3/1993 | Harpell et al. | 428/102 |
| 5,394,906 | * 3/1995 | Farley | 139/192 |
| 5,435,226 | * 7/1995 | McQuilkin | 89/36.02 |
| 5,747,144 | * 5/1998 | Beige et al. | 428/187 |
| 5,783,279 | * 7/1998 | Edgson et al. | 428/116 |
| 5,972,477 | * 10/1999 | Kim et al. | 428/175 |
| 6,186,966 | * 2/2001 | Grim et al. | 602/6 |
| 6,203,868 | * 3/2001 | Bonk et al. | 428/35.4 |

* cited by examiner

Primary Examiner—John J. Calvert
Assistant Examiner—Robert H. Muromoto, Jr.
(74) Attorney, Agent, or Firm—Glasgow Law Firm

(57) ABSTRACT

A multilayer laminated woven structure for ballistic protective wear that is moldable to substantially conform to a female torso and capable of retaining that molded shape for providing increased comfort and ease of movement when the protective wear is in use. A three-dimensional woven material is used for the base functional layer of the ballistic protective wear. Also, a thermoplastic material is employed to fuse the fibers of the three-dimensional woven material to each other to provide improved handling during lamination of the material and improved ballistic resistance during use.

15 Claims, 2 Drawing Sheets

BALLISTIC PROTECTIVE WEAR FOR FEMALE TORSO

BACKGROUND OF THE INVENTION (1) Field of the Invention

The present invention relates generally to ballistic protective wear or body armor and, more particularly, to a multilayer laminated woven structure for ballistic protective wear conformable to non-planar surfaces, e.g., female torso.

(2) Description of the Prior Art

Typically, multilayer fabrics have been used for composites and laminated structures. Additionally, the use of high performance fibers within multilayer laminated and composite structures is known in the art.

Prior art material for use in ballistic protective wear or body armor commonly employs laminated woven structures to provide resistance to penetration from high velocity and high impact projectiles.

Additionally, thermoplastic materials have been used in prior art to fuse fibers of textile structures for certain applications. More particularly, resins are used to provide interstitial strength and overall structural cohesion in a substrate after having been infused into the substrate and often treated under heat and/or pressure for curing.

However, prior art laminated materials for ballistic protection and impact resistance have not been well-suited for all body types of human beings, particularly when using the materials to provide ballistic protection in the torso region, especially for women. Given the requirements for laminate overall thickness to ensure ballistic- and impact-resistance effectiveness, most laminated materials for ballistic protection, particularly those developed for torso protection, have been constructed in a substantially planar vest form. While the vest form is configured to functionally satisfy ballistic- and impact-resistance requirements, its inflexibility, bulk, and thickness caused problems with fit, or match to torso size and shape, and comfort. Moreover, multiplayer fabric and laminate design precluded tailoring without compromising functional protective characteristics of the vest or body armor.

Thus, there remains a need for a multilayer laminated woven structure for ballistic protective wear that is moldable to substantially conform to non-planar human body shapes, e.g., a female torso and/or bust region, and capable of retaining that molded shape for providing increased comfort and ease of movement when the protective wear is in use.

SUMMARY OF THE INVENTION

It is an object of the present invention to provide a multilayer laminated woven material for ballistic protective wear that is moldable to substantially conform to non-planar human body regions, including but not limited to a female torso.

It is another object of the present invention to provide a multilayer laminated woven material that is capable of retaining a molded shape for providing increased comfort and ease of movement when the protective wear is in use.

Still another object of the present invention is to provide a method for making a multilayer laminated woven material for use in ballistic protective wear.

Accordingly, in support of these objects, it is one aspect of the present invention to provide a three-dimensional woven material that is used as a substrate and functional layer of a moldable ballistic protective material that can be used to cover portions of a human body.

Additionally, it is another aspect of the present invention to provide a three-dimensional woven material that incorporates a thermoplastic material that used to reinforce the fibers to provide improved handling during lamination of the material and improved ballistic resistance during use.

Preferably, the multilayer laminated woven structure includes a woven fabric having at least one layer of high performance fiber material in each of the substantially perpendicular yarn systems, i.e., the warp and filling directions of the fabric.

Also, it is yet another aspect of the present invention to provide a method for making a moldable, multilayer woven laminate and composite structure for use in protective body armor for ballistic- and impact-resistance that substantially conforms to non-planar surfaces of the human body, in particular a female torso.

Thus, the present invention provides a multilayer laminated woven structure for ballistic protective wear that is moldable to substantially conform to non-planar human body regions, including but not limited to a female torso, and capable of retaining that molded shape for providing increased comfort and ease of movement when the protective wear is in use and a method for making same.

These and other aspects of the present invention will become apparent to those skilled in the art after a reading of the following description of the preferred embodiment when considered with the drawings.

BRIEF DESCRIPTION OF THE INVENTION

DETAILED DESCRIPTION OF THE PREFERRED EMBODIMENTS

Figure 1:
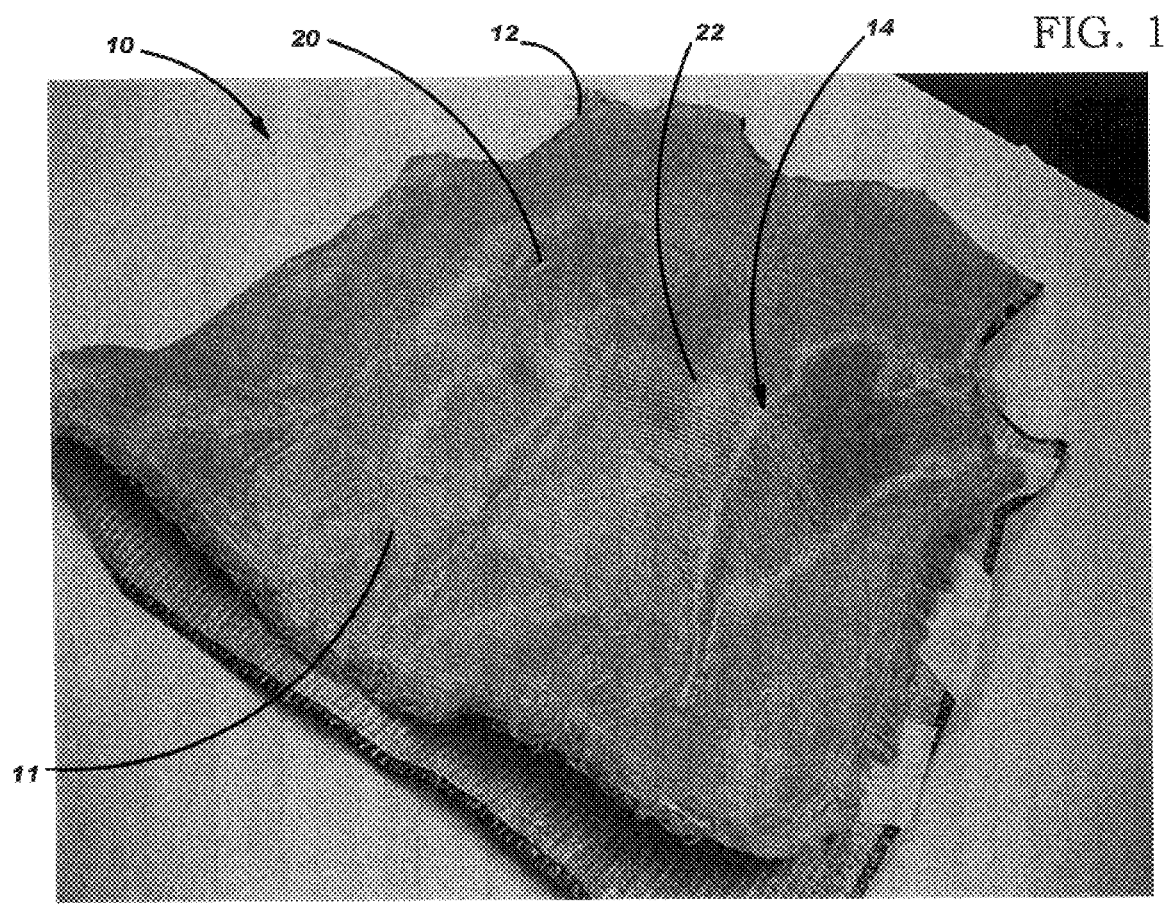
FIG. 1 is a perspective view of a ballistic protective vest for a female torso according to a preferred embodiment of the present invention.

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms.

Referring now to the drawings in general, the illustrations are for the purpose of describing a preferred embodiment of the invention and are not intended to limit the invention thereto. FIG. 1 shows a multilayer laminate 10 for ballistic protective wear in vest form constructed to conform to the natural curvature of a female torso, particularly having contoured regions 20, 22, which are highlighted by dashed lines 12 and 14. Notably, the material used to construct the vest form is generally substantially planar, i.e., exhibits body-side and exterior surfaces that are substantially parallel x-y planes, excepting the contoured regions. Prior art ballistic resistant vests typically had no deviation from a purely planar surface. However, the preferred embodiment according to the present invention includes deviation from a planar surface in the contoured regions, which may be predetermined to provide better fit and comfort, is generally symmetrical about the vest form's central bending axes.

Figure 2:
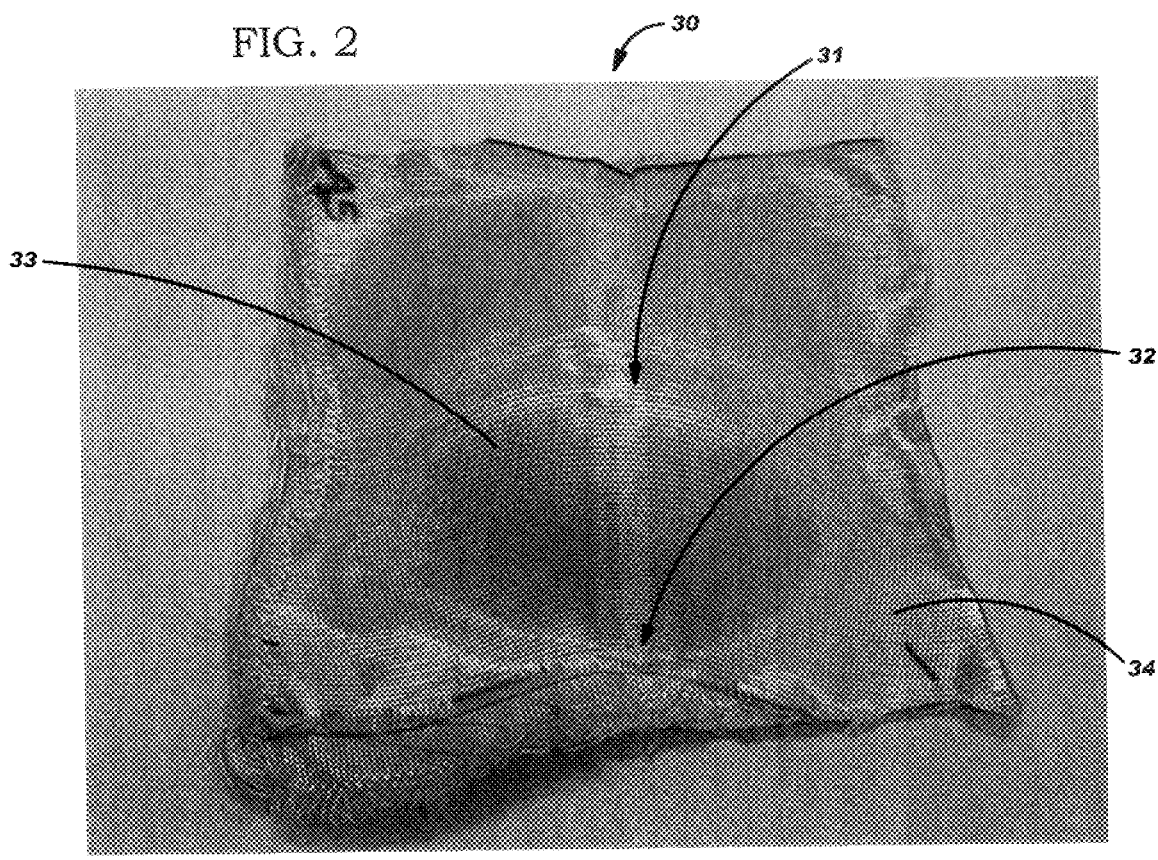
FIG. 2 is a perspective view of a contoured ballistic protective wear component according to a preferred embodiment of the present invention.

Also by contrast to the prior art, the preferred embodiment shown in FIG. 1, constructed according to the present invention, presents a multilayer laminate for ballistic and impact-resistant protective wear in sectional or component form, generally referenced 10, having a first shape in region 11 that substantially defines a planar surface and a second shape at regions 20, 22 defining predetermined non-planar surface regions having a concave form with variable dimensions. Likewise, another preferred embodiment shown in FIG. 2, is constructed according to the present invention presents a multilayer laminate for ballistic and impact-resistant protective wear in sectional or component form, generally referenced 30, having a first shape in region 34 that substantially defines a planar surface and a second shape at region 33, highlighted by lines 31 and 32, defining a predetermined non-planar surface region having a concave form with variable dimensions, that is not in a vest form but which may be constructed to conform to various contoured body portions individually, and/or to function as component inserts for use within a vest pocket region, and may be removable or fixed. The multilayer laminate material includes at least one layer of a three-dimensional woven material that is manufactured and configured according to the method and fabric product set forth and described in U.S. Pat. No. 5,465,760 issued Nov. 14, 1995 to Mohamed, et al., incorporated herein by reference in its entirety. Also, the multilayer laminate material, preferably a multilayer laminate woven material, may advantageously include at least one backface material, which may be either a 3-D or a 2-D woven material, laminated with at least one layer of a three-dimensional woven material, and/or at least one layer of a 2-D woven material, such that the at least one backface material provides a body-side surface and the at least one three-dimensional woven material provides an exterior surface presented as a primary impact surface for resistance to impact and penetration by ballistic or other projectile. Note that there may not be a backface material included, depending on the application or end use and requirements related thereto.

The at least one backface material may be constructed as a woven or nonwoven structure. Where the at least one backface material includes a multiplicity of backface material layers, the layers may be entirely woven, entirely nonwoven, or a combination of woven and nonwoven layers. Where the at least one backface material includes a woven layer, there exists a backface warp fiber system and a backface filling fiber system constructed with polymeric fibers either substantially homogeneously, in a fiber blend, or in systematically or predetermined repeating patterns alternating between like and different fiber types. Preferably, the at least one backface material includes fibers of aramids, polyethylene, Kelvar®, Dyneema®, and the like, either separately or in combination.

In the preferred embodiment according to the present invention, the at least one layer of three-dimensional woven material include Kelvar®. Preferably, between about 2 to about 12 layers of the 3-D woven material are used for making the substrate, more preferably, between about 4 to about 8 layers of the 3-D woven material are used in combination for making the substrate. Also, preferably, between about 2 to about 12 layers of 2-D material are used in combination with the multiple layers of 3-D woven material, more preferably, between about 3 to about 8 layers of 2-D material are used. Also, it is desirable to combine the multiple layers of 3-D material and 2-D material with at least one backing layer of 3-D material, similarly constructed to those 3-D woven material layers used to form the substrate. Thus, the multilayer laminate includes at least one three-dimensional woven material and at least one backface material, which may advantageously further include a stabilizer (not shown) for ensuring laminate stability during processing, handling, and during use as a finished product.

In a preferred embodiment, the stabilizer includes a resin, which is combined and/or integrated with the 3-D and 2-D materials that have been laminated together. The stabilizer resin is applied to the laminate after the at least one three-dimensional woven material and the at least one backface material are combined. Alternatively, the stabilizer may be a thermoplastic film applied between layers prior to final vest construction and/or assembly. After the stabilizer is introduced to the laminate structure, which forms substantially planar surfaces for both the body-side surface and exterior surface, the laminate is deformed to a predetermined degree in predetermined regions of the surfaces, thereby disrupting the substantially planar surface and creating non-planar regions 20, 22 (FIG. 1) projecting outward from the body-side surface toward the exterior surface. After deformation, the laminate is thermally and/or pressure treated to establish memory for shape retention to maintain the exterior surface and body-side surface non-planar regions in a deformed state compared to the initial, substantially planar surfaces of the laminate.

The present invention is further directed to a method for forming a multilayer laminate for ballistic and impact-resistant protective wear, wherein the method includes the steps of: providing at least one three-dimensional (3-D ) woven material having an exterior surface and an opposing body side surface, where the surfaces form a substantially planar surface; deforming at least one region of the substantially planar surface of the laminate to produce at least one non-planar surface, where the deformation is retained over time and not does not return to its initial substantially planar surface; providing at least one two-dimensional woven material that serves as a backside material; laminating the backside material to multilaminated three-dimensional woven material; and securing the backside material to the at least one three-dimensional woven material via the stabilizer thereby preventing delamination and increasing stability of the laminate.

In this process, it may be desirable to crease, fold, overlap, out, slit, or otherwise segment limited, select, and predetermined regions of the 3-D woven material in order to permit the material to more exactly conform to a given shape. Sufficient margin of material may be necessary for positioning and tensioning the material into the desired final form or shape.

Furthermore, a non-woven fusible material may be cut into a shape that would reasonably encompass and approximate the contoured area or region of a female bust or torso, particularly the front torso area. An additional fabric layer having form-retaining characteristics, e.g., Kelvar, may be advantageously added and/or combined with the non-woven material in order to provide better shape-retention in the contoured area. These layers, which form a shell, can then be combined with the 3-D and/or 3-D plus 2-D fabric multilaminated structures, assembled, and trimmed to approximate the desired finished dimensions. The assembly is then edge-stitched or otherwise connected, joined, and/or fused at the edge regions to facilitation further processing and to provide additional finished product stability, e.g., a federal 401 stitch at a margin of between about ¼" to about 2 inches, preferably about ¾" works to establish the profile of the assembly. Alternatively, the 3-D and/or 3-D plus 2-D multilaminated structure maybe inserted into the shell, which is then hemmed or otherwise sealed and closed, thereby completing the combination of layers to form a near-end shape multilaminated structure.

Alternatively, the laminate includes a stabilizer that is activated and set by body temperature, thereby ensuring a personal fit and optimal comfort for the user, either male or female, and regardless of the body region of application and use of the body armor laminate. The stabilizer may include resins, thermoplastics, and combinations thereof. In a preferred embodiment, the laminate is produced in a range of predetermined dimensions having substantially planar surfaces. The user selects the predetermined dimensions based upon his/her frame size, based on height and weight. Upon initial fitting, the laminate is pressed against the body surface to which a molded or fitted body armor laminate is needed to provide ballistic protection and impact-resistance. Pressure is applied and maintained as appropriate for the given laminate construction dimensions and the type of resin used, as is evident to one having ordinary skill in the art to which the present invention pertains. The combination of body heat and pressure activate the stabilizer after the laminate has been molded or adapted to substantially fit and conform to the contours and body region surfaces needing protection. Once the stabilizer has been initially activated and set, the laminate retains the shape and deformation from the initial substantially planar surfaces to provide non-planar regions that conform to the human body shape over which the laminate will be worn to provide optimal fit, comfort, and ballistic protection and impact resistance.

While the shape of the deformed regions 36, 38 is retained and is not entirely flexible, if additional deformation occurs after thermally and/or pressure treating or otherwise curing the stabilizer and during use, the shape of the deformed regions can be reestablished with slight to moderate application of pressure in that general region of deformation. Also, substantially no fabric wrinkling or overlap occurs in the deformed regions. As such, the laminate integrity and ballistic-impact-resistance is not compromised or substantially altered in the deformed regions.

In a preferred embodiment, the deformed regions are positioned in the chest region for a human torso, more particularly corresponding to the shape and dimensions of breasts of a female torso. To ensure proper fit and comfort, the deformed regions are constructed and dimensioned according to preshaped sizes of small, medium, and large framed users with estimated dimensions to fit the average person for a given body frame or size, based on height and weight. Further precision of fit and comfort is provided via deformed regions being constructed and dimensioned according to preshaped bra cup sizes, e.g., A, B, C, D, etc.

In one embodiment of the present invention, at least one three-dimensional woven material is laminated with a two-dimensional woven material to form a laminate structure. During weaving of the two-dimensional woven material, tension is controlled to minimize fiber and yarn crimp levels in one or both of the substantially perpendicular yarn systems, i.e., the warp and filling directions of a two-dimensional fabric. This fabric is laminated to a thin thermoplastic film, such as polyethylene, and the like. The film has a thickness between about 0.1 mils to 1.0 mils, preferably about 0.5 mils. The percentage of film by weight in the final laminated structure is preferably less than 20%. Laminates are made from a number of layers of fabric with cross-plies to control the amount of fiber present in each direction. The warp and filling may also include thermoplastic yarns in a predetermined pattern to provide cohesion between yarns and to improve ballistic resistance of the laminated structure.

Preferably, the multiplayer laminated woven structure includes a woven fabric having at least one layer of high performance fiber material in each of the substantially perpendicular yarn systems, i.e., at least the warp and filling directions of the fabric. In particular, high performance fibers include Kelvar, Dyneema fiber commercially available from DSM, and the like.

Ballistics performance for the non-planar vest are comparable to those for a planar vest constructed in the manner of prior art. No functional ballistic- and impact-resistance is compromised in the non-planar regions of the protective body armor.

EXAMPLE 1

This example is based upon testing conducted on a prototype with an initial female body armor design, which included seven layers of 3-D material formed as 2.5 30×25, combined with four layers of a two dimensional material that were sandwiched between the initial 3-D layers and a single backing layer of 3-D material. The primary goal of this initial prototype was to obtain a soft armor vest inserts that would still meet level IIIA Police Armor standards established by the National Institute of Justice (NIJ). Testing was conducted in accordance with the abbreviated procedures of NU-STD-0101.03 (Level IIIA) using calibers 9 mm, 124.0 grain, FMJ, and 0.44 Magnum, 16.5 feet from the muzzle of a test barrel to produce zero and thirty (30) degree obliquity impacts. Lumiline screens were positioned at 6.5 and 9.5 feet, which, in conjunction with an elapsed time counter or chronograph, were used to compute projectile velocities 8.0 feet from the muzzle. Table 1 is a summary of the data records for this testing of the initial prototype.

TABLE 1

FEMALE BODY ARMOR INITIAL PROTOTYPE BALLISTIC TEST RESULTS

| weight (lbs) | obliquity (degrees) | caliber | shots | velocity (max) | velocity (min) | penetration | deformation *(max)(mm) | deformation *(min)(mm) |
|---|---|---|---|---|---|---|---|---|
| 1.56 | 0 | 9 mm | 4 | 1436 | 1422 | 2 | 36 | 34 |
| 1.56 | 30 | 9 mm | 2 | 1422 | 1416 | 0 | n/a | n/a |
| 2.01 | 0 | .44 Mag | 4 | 1444 | 1401 | 2 | 51 | 43 |
| 2.01 | 30 | .44 Mag | 2 | 1434 | 1408 | 0 | n/a | n/a |

*deformation of a 5.5 in. thick clay backing positioned behind panels

The results of this testing on the initial prototype are useful for application to both male and female-specific body armor designs. Additionally, these results are useful outside the NIJ-regulated U.S./domestic applications for ballistic-resistant products, including but not limited to military protective applications. Moreover, the combination of inserts is demonstrated with this initial prototype and testing as a useful alternative to continuous-fabric ballistic-resistant protective wear, as well as for use in combination therewith.

The initial prototype testing included eight (8) layers of 2.5 30×25 3-D woven material using high performance fibers supplied by Dupont®, combined with six (6) layers of a 2-D fabric, in particular comprised of 840 denier fiber, as commonly used in U.S. Navy Flak Vest material.

Ballistic and blunt trauma testing results on 15"×15" shot packs using various stitching patterns indicated that the initial prototype performed well, although experiencing some deformation from the shot testing. Stitching patterns provide some variation, including but not limited to quilt stitching, geometric stitching, etc., which are stitched at the center of the initial prototype vest. The panel construction of the initial prototype vest may be substituted for alternative means for configuring, arranging, and removably securing or permanently fixing, and/or otherwise integrating the ballistic-resistant multilaminate material into a form that can be worn by a human being in various configurations to protect differently-shaped, contoured body regions.

Certain modifications and improvements will occur to those skilled in the art upon a reading of the foregoing description. By way of example, additional high performance fiber types and resins may be used with the 3-D multilaminated structures of the present invention to advantageously improve the overall performance of the structure, without departing from the scope of the present invention. All modifications and improvements have been deleted herein for the sake of conciseness and readability but are properly within the scope of the following claims.

We claim:

1. A multilayer laminate for ballistic and impact-resistant protective wear comprising:
   at least one three-dimensional woven material providing an exterior surface, wherein each of the at least one three-dimensional woven material has three substantially orthogonal fiber systems and an opposing body side surface, the surfaces forming a substantially planar surface having at least one region including a non-planar surface.

2. The multilayer laminate according to claim 1, further including a stabilizer combined with the at least one three-dimensional woven material for providing increased dimensional stability and resistance to delamination.

3. The multilayer laminate according to claim 2, further including at least one two-dimensional woven material providing a backside material that is laminated to the at least one three-dimensional woven material and secured thereto via the stabilizer.

4. The multilayer laminate according to claim 2, wherein the stabilizer is a resin.

5. The multilayer laminate according to claim 4, wherein the stabilizer is activated and set by exposure to a predetermined temperature and non-ambient pressure.

6. The multilayer laminate according to claim 1, wherein the laminate has a shape-retention memory for preserving the non-planar surface.

7. The multilayer laminate according to claim 6, wherein the shape-retention memory for preserving the non-planar surface is provided by a layer of material having shape-retention characteristics.

8. The multilayer laminate according to claim 6, wherein the shape-retention memory for preserving the non-planar surface is provided by a layer of material having shape-retention characteristics.

9. The multilayer laminate according to claim 1, wherein at least one of the fiber systems includes high performance fibers.

10. The multilayer laminate according to claim 1, wherein each of the fiber systems includes high performance fibers.

11. The multilayer laminate according to claim 9, wherein the high performance fibers are aramid fibers.

12. The multilayer laminate according to claim 1, wherein the at least one three-dimensional woven material is used as inserts into a shell that can be worn to provide ballistic-resistance.

13. A method for forming a multilayer laminate for ballistic and impact-resistant protective wear comprising the steps of:
   providing at least one three-dimensional woven material with three substantially orthogonal fiber systems having an exterior surface and an opposing body side surface, the surfaces forming a substantially planar surface
   deforming at least one region of the substantially planar surface of the laminate to produce at least one non-planar surface, the at least one non-planar surface being retained over time and not returning to its initial substantially planar surface.

14. The method according to claim 13, further including the steps of providing a stabilizer and introducing the stabilizer into the at least one three-dimensional material thereby ensuring memory and retention of deformation in the non-planar surface.

15. The method according to claim 13, further including the steps of
   providing at least one two-dimensional woven material that serves as a backside material,
   laminating the backside material to the at least one three-dimensional woven material,
   and securing the backside material to the at least one three-dimensional woven material via the stabilizer thereby preventing delamination and increasing stability of the laminate.

* * * * *

UNITED STATES PATENT AND TRADEMARK OFFICE
CERTIFICATE OF CORRECTION

PATENT NO. : 6,281,149 B1
DATED : August 28, 2001
INVENTOR(S) : Mansour Hussein Mohamed It is certified that error appears in the above-identified patent and that said Letters Patent is hereby corrected as shown below:

Title page,
Item [75], the first inventor's name, "Mansour Hussein" should be -- Mansour Hussein Mohamed --.

Signed and Sealed this

Twenty-third Day of October, 2001

Attest:

NICHOLAS P. GODICI
Attesting Officer
Acting Director of the United States Patent and Trademark Office